US010571758B2

(12) United States Patent
Yueh et al.

(10) Patent No.: US 10,571,758 B2
(45) Date of Patent: Feb. 25, 2020

(54) DISPLAY DEVICE

(71) Applicant: InnoLux Corporation, Miao-Li County (TW)

(72) Inventors: Jui-Jen Yueh, Miao-Li County (TW); Kuan-Feng Lee, Miao-Li County (TW); Chandra Lius, Miao-Li County (TW); Yuan-Lin Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/863,104

(22) Filed: Jan. 5, 2018

(65) Prior Publication Data

US 2019/0212600 A1 Jul. 11, 2019

(51) Int. Cl.
*G02F 1/1345* (2006.01)
*G02F 1/1368* (2006.01)
*G02F 1/1333* (2006.01)
*G02F 1/1335* (2006.01)

(52) U.S. Cl.
CPC ........ *G02F 1/13452* (2013.01); *G02F 1/1333* (2013.01); *G02F 1/1335* (2013.01); *G02F 1/1368* (2013.01); *G02F 1/13338* (2013.01); *G02F 2001/13356* (2013.01); *G02F 2001/133388* (2013.01); *G02F 2201/42* (2013.01)

(58) Field of Classification Search
CPC ..... H01L 33/20; G02F 1/1368; G02F 1/1335; G02F 1/13338; G02F 1/13452

USPC ........................................................... 257/72
See application file for complete search history.

(56) References Cited

U.S. PATENT DOCUMENTS

| 8,115,292 B2 * | 2/2012 | Toh ....................... H01L 21/486 257/686 |
| 9,158,162 B2 * | 10/2015 | Liu .................... G02F 1/134309 |
| 9,543,334 B2 * | 1/2017 | Yen ........................ H01L 27/124 |
| 2004/0023499 A1 * | 2/2004 | Hellig ............... H01L 21/76816 438/694 |
| 2012/0218219 A1 * | 8/2012 | Rappoport .......... H01L 27/3276 345/174 |
| 2013/0088671 A1 * | 4/2013 | Drzaic ................ G02F 1/13452 349/106 |
| 2015/0021081 A1 | 1/2015 | Mitarai et al. |
| 2016/0190389 A1 | 6/2016 | Lee et al. |
| 2017/0117336 A1 | 4/2017 | Rappoport et al. |

FOREIGN PATENT DOCUMENTS

WO WO-2007110995 A1 * 10/2007 ........... G02F 1/1339

* cited by examiner

*Primary Examiner* — Ismail A Muse
*Assistant Examiner* — Charles N Ausar-El
(74) *Attorney, Agent, or Firm* — Muncy, Geissler, Olds & Lowe, P.C.

(57) ABSTRACT

A display device is disclosed, which includes: a first substrate having a first hole and a second hole; and a circuit layer disposed at one side of the first substrate, wherein the first hole has a first width, the second hole has a second width, and a ratio of the second width to the first width is within a range between 20 and 4000.

18 Claims, 16 Drawing Sheets

DISPLAY DEVICE

BACKGROUND

1. Field

The present disclosure relates to a display device and, more particularly, to a display device with a substrate having two different holes.

2. Description of Related Art

With the continuous advancement of technologies related to displays, all the display apparatuses are now developed toward compactness, thinness, and lightness. Therefore, cathode-ray-tube displays are replaced by thin displays as the mainstream display devices on the market. However, efforts are still needed, such as optimizing the circuit arrangement in the peripheral region, to achieve the purpose of forming a display device with a narrow border region.

SUMMARY

The present disclosure provides a display device, which comprises: a first substrate having a first hole and a second hole; and a circuit layer disposed at one side of the first substrate, wherein the first hole has a first width, the second hole has a second width, and a ratio of the second width to the first width is within a range between 20 and 4000.

Other novel features of the disclosure will become more apparent from the following detailed description when taken in conjunction with the accompanying drawings.

DETAILED DESCRIPTION OF EMBODIMENT

The following embodiments when read with the accompanying drawings are made to clearly exhibit the above-mentioned and other technical contents, features and/or effects of the present disclosure.

Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the ordinals recited in the specification and the claims such as "above", "over", or "on" are intended not only directly contact with the other element, but also intended indirectly contact with the other element. Similarly, the ordinals recited in the specification and the claims such as "below", or "under" are intended not only directly contact with the other element but also intended indirectly contact with the other element.

In addition, the features in different embodiments of the present disclosure can be mixed to form another embodiment.

Embodiment 1

Figure 1:
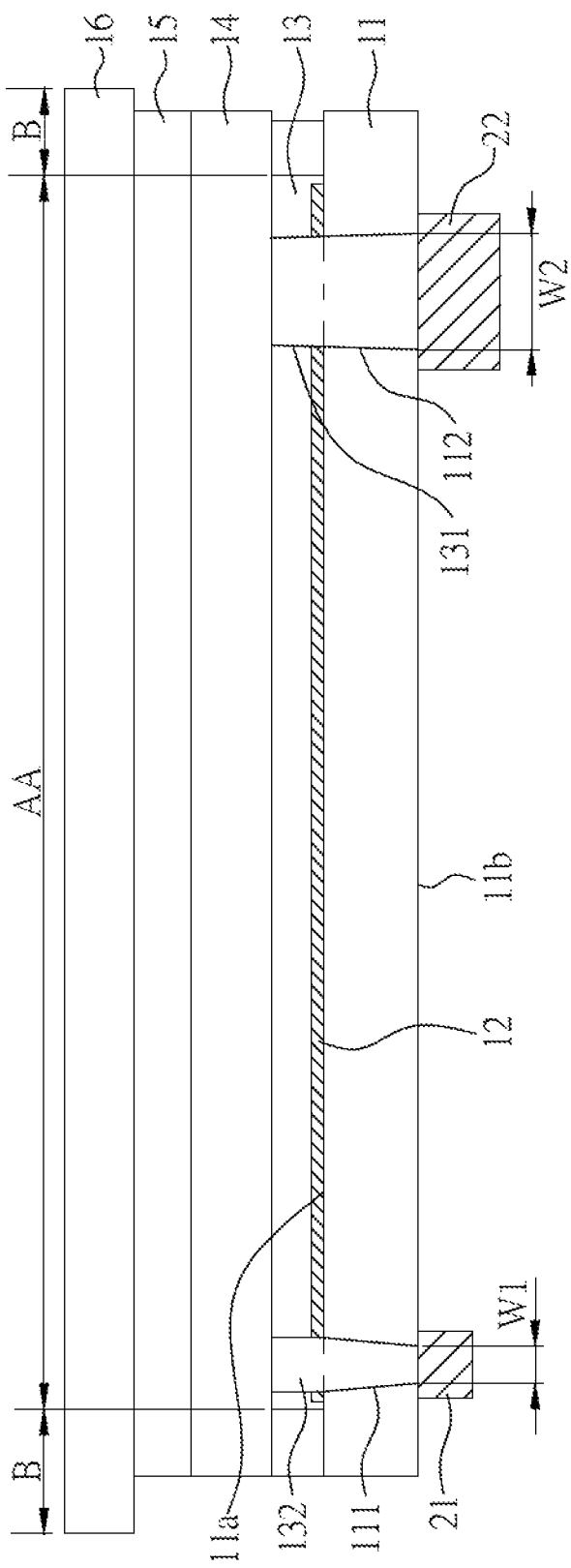
FIG. 1 is a cross-sectional view of a display device according to Embodiment 1 of the present disclosure.
Figure 2:
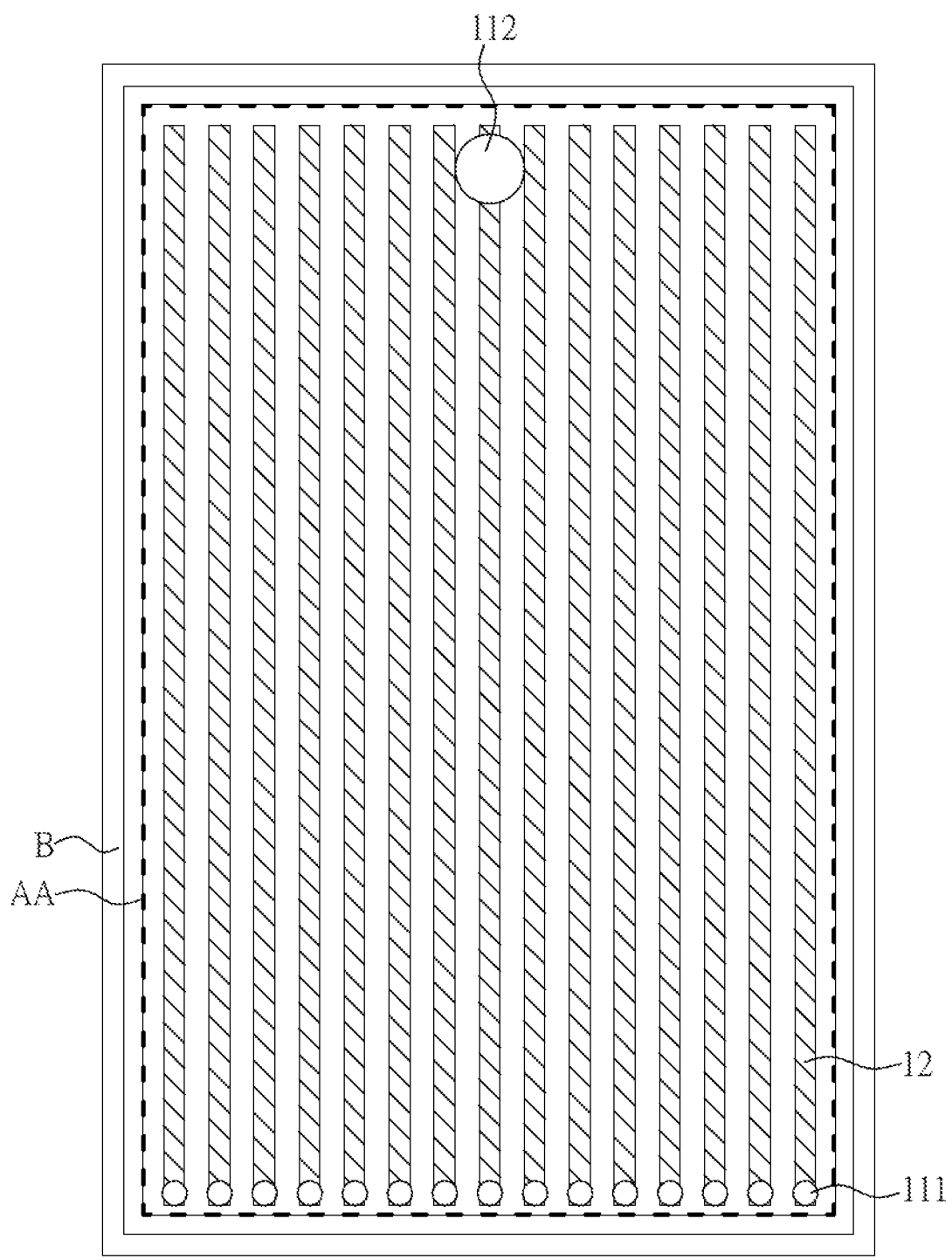
FIG. 2 is a top view of a display device according to Embodiment 1 of the present disclosure.

FIG. 1 and FIG. 2 are respectively a cross-sectional view and a top view of a display device of the present embodiment. The display device of the present embodiment comprises: a first substrate 11 having a first hole 111 and a second hole 112; a circuit layer 12 disposed at one side of the first substrate 11. Herein, the first substrate 11 has a first surface 11a and a second surface 11b; and in the present embodiment, the circuit layer 12 is disposed on the first surface 11a. In addition, the first hole 111 and the second hole 112 are through holes. In the present disclosure, if the first substrate 11 has more than two holes, the first hole 111 refers to the smallest hole and the second hole 112 refers to the biggest hole. Furthermore, in the present embodiment, as shown in FIG. 2, the first hole 111 and the second hole 112 are disposed adjacent to two opposite edges of the first substrate 11, but the present disclosure is not limited thereto. In other embodiments of the present embodiment, the first hole 111 and the second hole 112 can be disposed adjacent to the same edge of the first substrate 11. In addition, the pattern of the circuit layer 12 of the display device of the present disclosure is not limited to that shown in figures of the present disclosure.

In addition, the display device of the present embodiment further comprises: a display medium layer 13 disposed on the circuit layer 12; a second substrate 14 disposed on the display medium layer 13; an adhesive layer 15 disposed on the second substrate 14; and a cover substrate 16 disposed on the adhesive layer 15. The circuit layer 12 can comprise plural transistors (not shown in the figure) to drive the display medium layer 13. In addition, the elements of the display device shown in the present embodiment are not limited to those stated above; other elements such as a polarizer film or touch units may also be interposed between any two elements stated above. For example, touch units (not shown in the figure) may be disposed on the first substrate 11 to obtain an in-cell touch display device; touch units (not shown in the figure) may be disposed between the second substrate 14 and the cover substrate 16 to obtain an on-cell touch display device; or touch units (not shown in the figure) may be disposed outside the cover substrate 16 to obtain an out-cell touch display device.

In the present embodiment, the first substrate 11, the second substrate 14 and the cover substrate 16 can be a quartz substrate, a glass substrate, a plastic substrate, other flexible substrates or films. When the substrate 11 and the second substrate 14 are plastic substrates, flexible substrates or films, the display device of the present embodiment can be a flexible display device. In other embodiments of the present disclosure, the second substrate 14 can be a barrier film or an encapsulating film; and the display device can be a flexible display device. In further other embodiments of the present disclosure, the cover substrate 16 can be a protection glass substrate or a polarizer.

In the present embodiment, the display medium layer 13 may comprise, but is not limited to organic light-emitting diodes (OLEDs), light-emitting diodes (LEDs), mini light-emitting diodes (mini LEDs), micro light-emitting diodes (micro LEDs), quantum-dot light-emitting diodes (QLEDs), or other display medium. Herein, the LEDs may have a size ranged from 300 μm to 10 mm, the mini LEDs may have a size ranged from 100 μm to 300 μm, and the micro LEDs may have a size ranged from 1 μm to 10 μm; but the present disclosure is not limited thereto. In addition, the adhesive layer 15 can be an optical clear adhesive, an edge adhesive, a tape or other adhesion material.

In the present embodiment, the display device further comprises: a display region AA and a border region B adjacent to the display region AA, wherein the first hole 111 and the second hole 112 are disposed in the display region AA. As shown in FIG. 1 and FIG. 2, in the display device of the present embodiment, the whole first hole 111 and the whole second hole 112 are disposed in the display region AA.

As the display device developed, the screen-to-body ratio is gradually increased. In the present embodiment, when at least a part of the first hole 111 or at least a part of the second hole 112 is disposed in the display region AA, high screen-to-body ratio can be achieved. Especially, when the whole first hole 111 and the whole second hole 112 are disposed in the display region AA, approximately full screen-to-body ratio can be achieved.

In the present embodiment, the first hole 111 can be used for electrical signal receiving function or other specific function, or can be used to secure signal path entering in the display device from the cover substrate 16. The second hole 112 can be used to create a light path for the light entering into the display device from the cover substrate 16, or can be used to receive weak signals or one of the crucial signals for display device. Since the second hole 112 is used to create the light path or receive weak or crucial signals, the second width W2 of the second hole 112 cannot be too small, in order to ensure enough light or signal amounts entering into the display device. In addition, to achieve the purpose of forming a display device with a narrow border region, to increase the aperture ratio or to minimize an influence on the display quality, the first width W1 of the first hole 111 cannot be too large. Hence, in the display device of the present embodiment, the first hole 111 has a first width W1, the second hole 112 has a second width W2, and a ratio of the second width W2 to the first width W1 is within a range between 20 and 4000.

If the first hole 111 is used for receiving electrical signal, the first width W1 of the first hole 111 can be within a range between 2 and 50 micrometers (2 μm≤W1≤50 μm). If the first width W1 is less than 2 micrometers (W1<2 μm), the issue of high contact resistance may be occurred. If the first width W1 is more than 50 micrometers (W1>50 μm), the border region B of the display device may not be narrow enough or the display quality may be influenced, and the purpose of forming a display device with a narrow border region or high aperture ratio cannot be achieved.

If the second hole 112 is used to create the light path or to receive weak signals or one of the crucial signals for display device, the second width W2 of the second hole 112 can be within a range between 1000 and 8000 micrometers (1000 μm≤W2≤8000 μm). If the second width W2 is less than 1000 micrometers (W2<1000 μm), the light or signal amounts entering into the display device may not be enough and cannot meet the sensing requirement of a second electronic unit 22 (such as a camera, a photo sensor or an antenna) disposed below the second hole 112. If the second width W2 is more than 8000 micrometers (W2>8000 μm), the mechanical strength of the first substrate 11 may be decreased and the first substrate 11 may be easily broken.

Herein, the first width W1 of the first hole 111 and the second width W2 of the second hole 112 can be defined as follow. The first substrate 11 has the first surface 11a and the second surface 11b opposite to the first surface 11a, the first width W1 is a width (especially referred to a maximum with) of the first hole 111 on the second surface 11b, and the second width W2 is a width (especially referred to a maximum with) of the second hole 112 on the second surface 11b.

In addition, in the present embodiment, the shapes of the first hole 111 and the second hole 112 are also not limited. For example, the shapes of the first hole 111 and the second hole 112 from the top view of the display device can be a circle, an ellipse, a square, a rectangle, a polygon, or other irregular shape; and the shapes of the first hole 111 and the second hole 112 from the cross sectional view of the display device can be a rectangle, a trapezoid, an inversed trapezoid, a funnel shape or other irregular shape. However, the present disclosure is not limited thereto, as long as the first width W1 and the second width W2 satisfy the aforementioned definitions.

In the display device of the present embodiment, the display medium layer 13 disposed on the first substrate 11 has a first signal passing tunnel 131 disposed corresponding to the second hole 112. In addition, the display medium layer 13 further has a second signal passing tunnel 132 disposed corresponding to the first hole 111. Herein, the first signal passing tunnel 131 and the second hole 112 together form a hollow tunnel, and signal can pass through the hollow tunnel. Also, the second signal passing tunnel 132 and the first hole 111 together form another hollow tunnel, and signal can pass through the hollow tunnel.

In the present embodiment, the display device may further comprise a first electronic unit 21 disposed corresponding to the first hole 111 and a second electronic unit 22 disposed corresponding to the second hole 112. More specifically, the first electronic unit 21 is disposed corresponding to the first hole 111, and is disposed under the first substrate 11 (or on the second surface 11b) and outside the first hole 111. The second electronic unit 22 is disposed corresponding to the second hole 112, and is disposed under the first substrate 11 (or on the second surface 11b) and outside the second hole 112. The first electronic unit 21 can be a gate driver IC, a data driver IC, a Tcon (timing controller) IC, or other electronic unit receiving electrical signal. The first electronic unit 21 can also be a fingerprint sensor or a photo sensor receiving light signal such as visible light, IR light or UV light. In addition, the second electronic unit 22 can be a camera, a fingerprint sensor or a photo sensor receiving light signal such as visible light, IR light or UV light. The second electronic unit 22 can also be an antenna or other electronic unit receiving electrical signal. In the present embodiment, the first signal passing tunnel 131 and the second hole 112 together form a hollow tunnel, and the second signal passing tunnel 132 and the first hole 111 together form another hollow tunnel. Hence, if the first electronic unit 21 is a photo sensor and the second electronic unit 22 is a camera or a photo sensor, light or photo signals can pass through these two hollow tunnels to achieve the first electronic unit 21 and the second electronic unit 22. If the first electronic unit 21 is a camera, a fingerprint sensor or other sensors with larger dimension, a plurality of first holes 111 might be disposed correspondingly to increase sensing sensitivity.

Herein, the first electronic unit 21 and the second electronic unit 22 can be disposed under the first substrate 11 (or on the second surface 11b) with or without a binder (not shown in the figure). If the first electronic unit 21 and the second electronic unit 22 are disposed under the first substrate 11 (or on the second surface 11b) without a binder, the positions of the first electronic unit 21 and the second electronic unit 22 can be fixed with other units such as a frame, a backboard, a mechanical element or the like (not shown in the figure).

Embodiment 2

Figure 3:
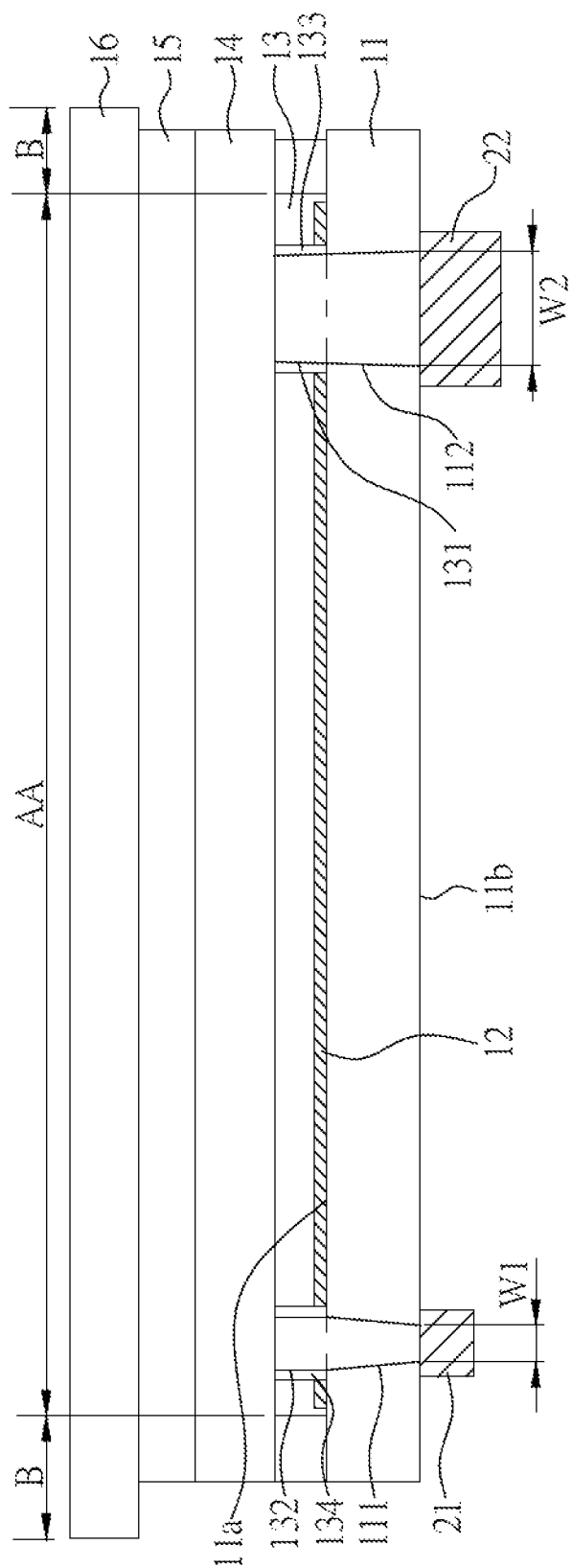
FIG. 3 is a cross-sectional view of a display device according to Embodiment 2 of the present disclosure.

FIG. 3 is a cross-sectional view of a display device of the present embodiment. The display device of the present embodiment is similar to that shown in Embodiment 1, except that the display media are different.

In the present embodiment, the display medium layer 13 may comprise liquid crystals (LCs). Because the liquid crystals are in fluid form, dam units 133, 134 are disposed in the display medium layer 13. More specifically, the first signal passing tunnel 131 is formed by the dam unit 133 formed in the display medium layer 13, and the second signal passing tunnel 132 is formed by the dam unit 134 formed in the display medium layer 13. Therefore, the purpose of preventing liquid crystals flow into the first hole 111 and the second hole 112 can be achieved.

Embodiment 3

Figure 4:
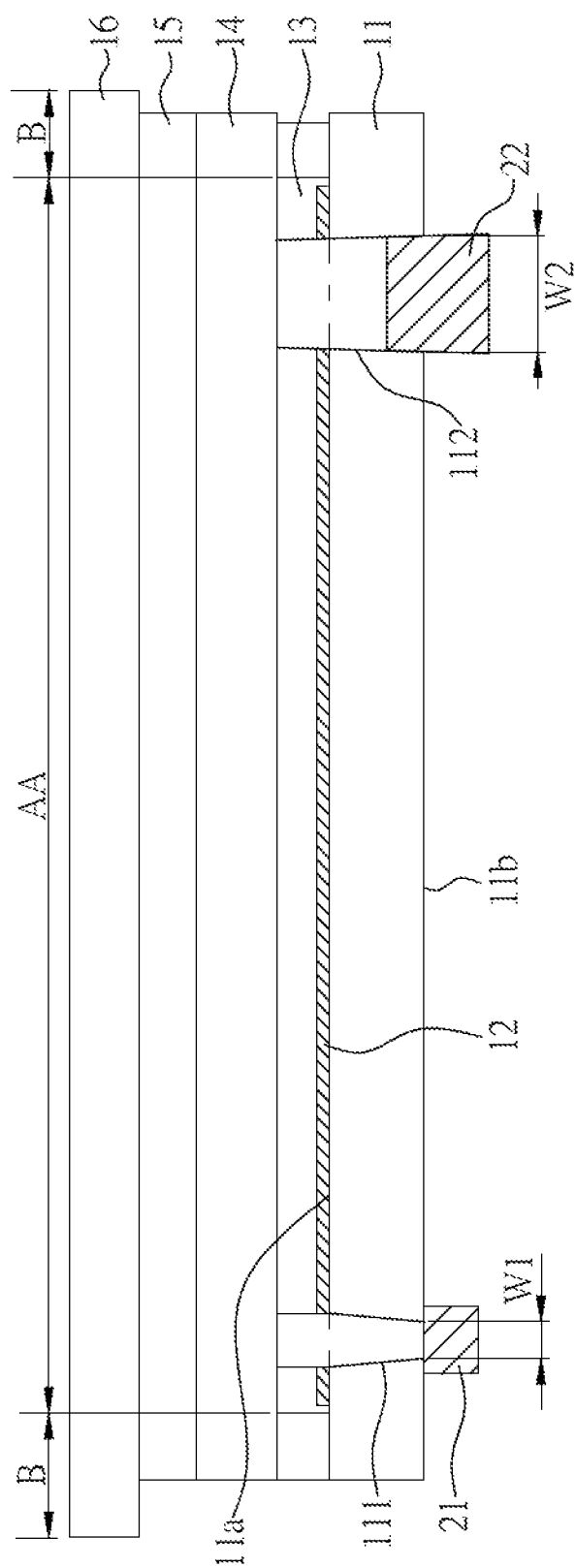
FIG. 4 is a cross-sectional view of a display device according to Embodiment 3 of the present disclosure.

FIG. 4 is a cross-sectional view of a display device of the present embodiment. The display device of the present embodiment is similar to that shown in Embodiment 1, except that the dispositions of the second electronic devices are different.

In the present embodiment, at least a part of the second electronic unit 22 is disposed in the second hole 112 and another part of the second electronic unit 22 is disposed outside the second hole 112. In other embodiment of the present disclosure, at least a part of the first electronic unit 21 is disposed in the first hole 111 and another part of the first electronic unit 21 is disposed outside the first hole 111.

Embodiment 4

Figure 5:
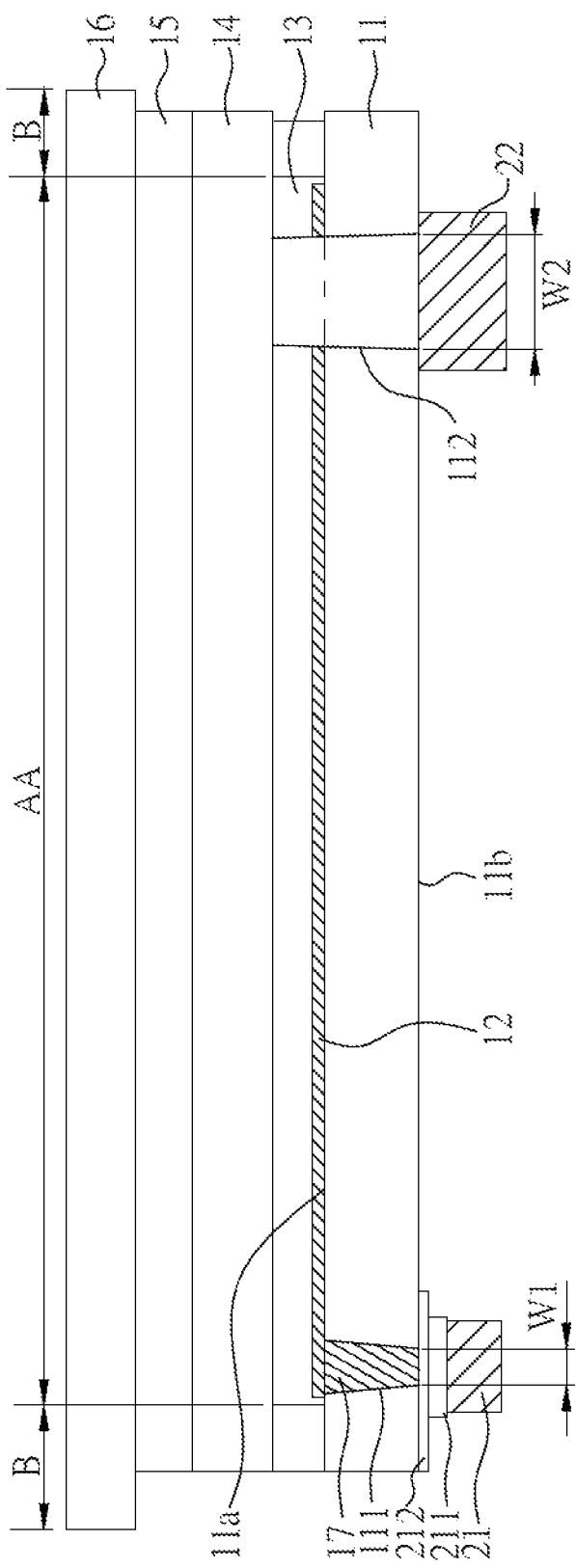
FIG. 5 is a cross-sectional view of a display device according to Embodiment 4 of the present disclosure.

FIG. 5 is a cross-sectional view of a display device of the present embodiment. The display device of the present embodiment is similar to that shown in Embodiment 1, except that the following differences.

In the display device of the present embodiment, the passing tunnel 132 (as shown in FIG. 1) is not disposed in the display medium layer 13. In addition, in the display device of the present embodiment, a conductive element 17 is disposed in the first hole 111 and the conductive element 17 is electrically connected with the circuit layer 12. In addition, a conductive layer 212 (which can be a circuit layer or a metal pad) is further disposed on the second surface 11b of the first substrate 11, and the first electronic unit 21 is electrically connected with the conductive layer 212 through a conductive film 211 (for example, an anisotropic conductive film (ACF) or a solder gel). Hence, in the present embodiment, the conductive element 17 filling in the first hole 111 is used to electrically connect the circuit layer 12 on the first surface 11a to the conductive layer 212 on the second surface 11b, so the electrical signal from the first electronic unit 21 can transmit to the circuit layer 12 via the conductive film 211, the conductive layer 212 and the conductive element 17 to drive the display medium layer 13.

Herein, the material of the conductive element 17 can be any conductive material such as metals (for example, Cu, Ag, Au, Al, Mo, Ti, In, Sn, or an alloy thereof), conductive oxides (for example, ITO, IZO, ITZO, IGZO, or AZO) or a combination thereof; but the present disclosure is not limited thereto.

Embodiment 5

Figure 6:
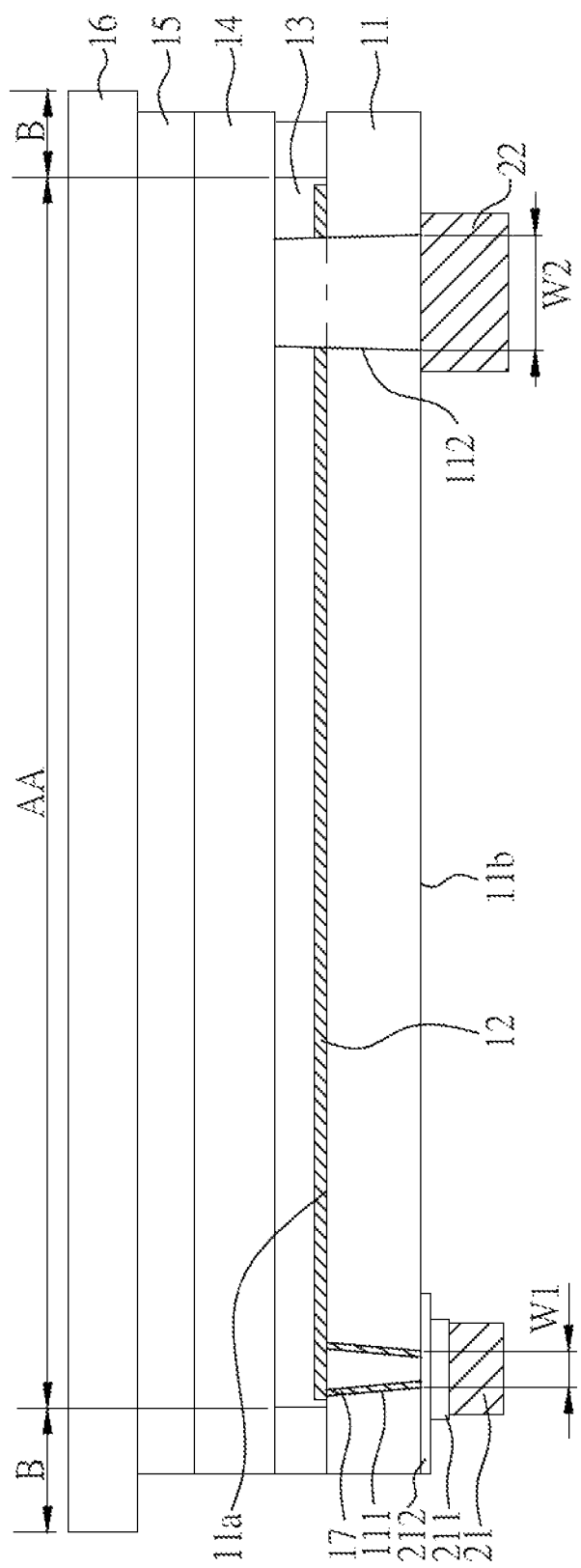
FIG. 6 is a cross-sectional view of a display device according to Embodiment 5 of the present disclosure.

FIG. 6 is a cross-sectional view of a display device of the present embodiment. The display device of the present embodiment is similar to that shown in Embodiment 4, except the disposition of the conductive element.

As shown in FIG. 5, in Embodiment 4, the conductive element 17 fills the whole first hole 111. As shown in FIG. 6, in the present embodiment, the conductive element 17 is only disposed on sidewalls of the first hole 111, as long as the conductive element 17 can electrically connect with the circuit layer 12 and the conductive layer 212.

Embodiment 6

Figure 7:
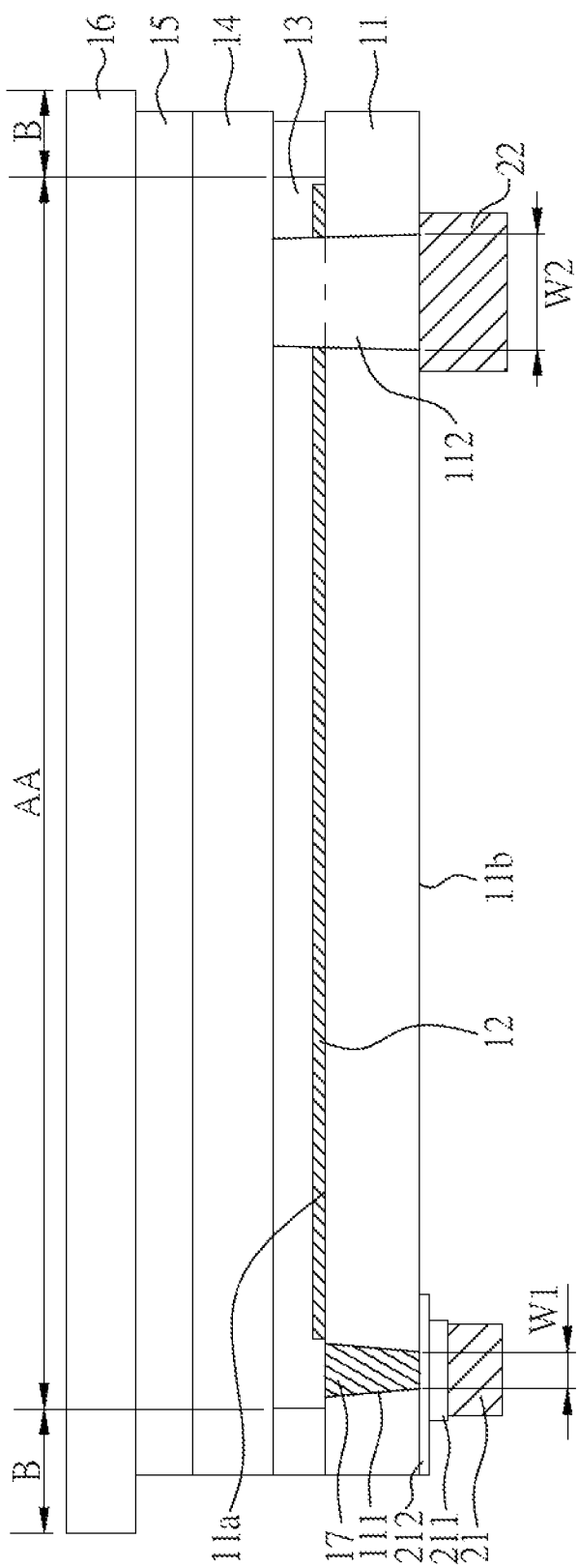
FIG. 7 is a cross-sectional view of a display device according to Embodiment 6 of the present disclosure.

FIG. 7 is a cross-sectional view of a display device of the present embodiment. The display device of the present embodiment is similar to that shown in Embodiment 4, except that the relations between the circuit layers 12 and the conductive elements 17 are different.

As shown in FIG. 5, in Embodiment 4, the conductive element 17 electrically connects with the circuit layer 12. As shown in FIG. 7, in the present embodiment, the conductive element 17 dose not electrically connect with the circuit layer 12. Hence, in the present embodiment, the conductive element 17 is not used to transmit signal to the circuit layer 12, and may be used as an antenna or a receiving unit for radiofrequency identification (RFID), but the present disclosure is not limited thereto.

Embodiment 7

Figure 8:
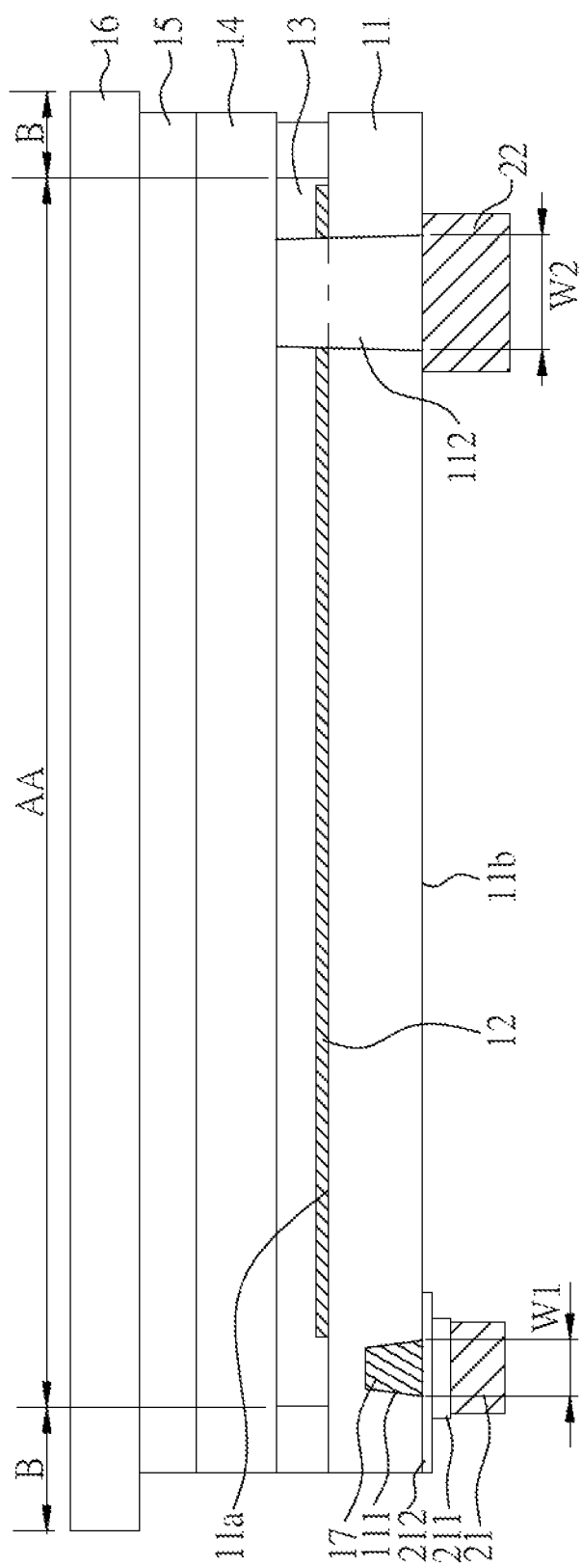
FIG. 8 is a cross-sectional view of a display device according to Embodiment 7 of the present disclosure.

FIG. 8 is a cross-sectional view of a display device of the present embodiment. The display device of the present embodiment is similar to that shown in Embodiment 4, except for the shapes of the first holes.

In the present embodiment, the first hole 111 is a via hole, but not a through hole as shown in FIG. 3. In addition, the conductive element 17 disposed in the first hole 111 electrically connects with the conductive layer 212, but not to the circuit layer 12. Hence, in the present embodiment, the conductive element 17 is not used to transmit signal to the circuit layer 12, and may be used as an antenna or a receiving unit for radiofrequency identification (RFID), but the present disclosure is not limited thereto.

Embodiment 8

Figure 9:
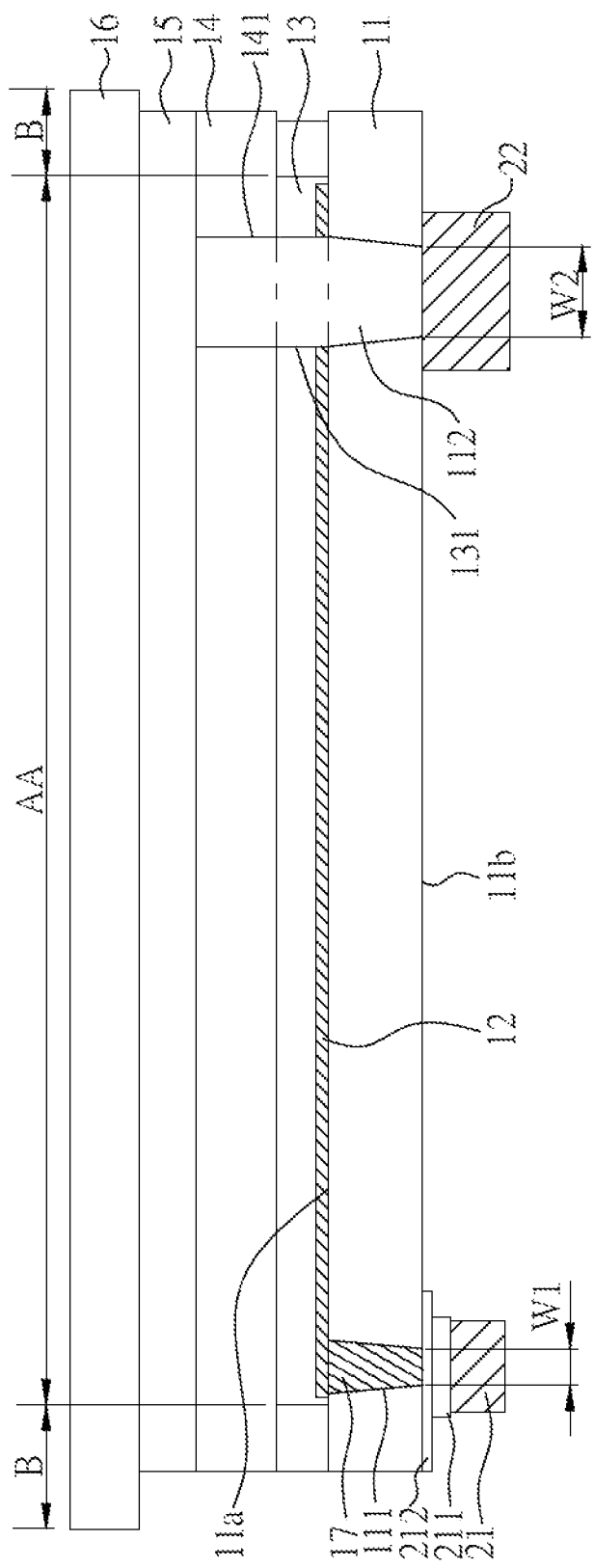
FIG. 9 is a cross-sectional view of a display device according to Embodiment 8 of the present disclosure.

FIG. 9 is a cross-sectional view of a display device of the present embodiment. The display device of the present embodiment is similar to that shown in Embodiment 4, except that the structures of the second substrates are different.

In the present embodiment, the display medium layer 13 is disposed between the first substrate 11 and the second substrate 14, the second substrate 14 has a third hole 141, and the second hole 112 is disposed corresponding to the third hole 141 to form a tunnel. In addition, the display medium layer 13 has a first signal passing tunnel 131, and the second hole 112, the first signal passing tunnel 131 and the third hole 141 together form a hollow tunnel that signal can pass through the hollow tunnel. When the second substrate 14 has the third hole 141, the transparency of the region corresponding to the second electronic unit 22 can be improved to further meet the sensing requirement of the second electronic unit 22.

Embodiment 9

Figure 10:
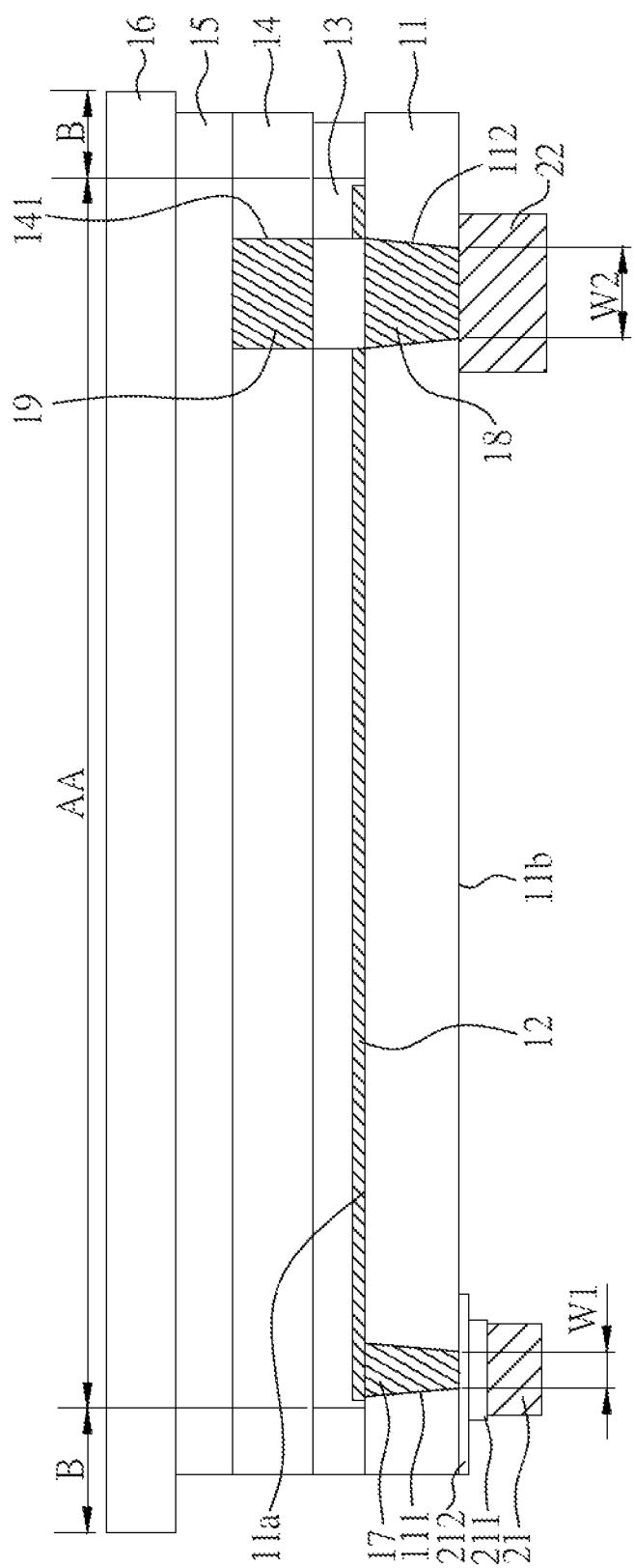
FIG. 10 is a cross-sectional view of a display device according to Embodiment 9 of the present disclosure.

FIG. 10 is a cross-sectional view of a display device of the present embodiment. The display device of the present embodiment is similar to that shown in Embodiment 8, except that at least one optical element is disposed in the display device of the present embodiment.

In the present embodiment, a first optical element 18 is further disposed in the second hole 112, and a second optical element 19 is further disposed in the third hole 141. Herein, the first optical element 18 and the second optical element 19 can respectively be a filter with optical filter property, a micro lens for light collection, other material with high transparency, or a combination of the abovementioned elements; but the present disclosure is not limited thereto.

In addition, in other embodiments of the present disclosure, the second hole 112 is not disposed with the first optical element 18, and the third hole 141 is disposed with the second optical element 19; and vice versa.

Embodiment 10

Figure 11:
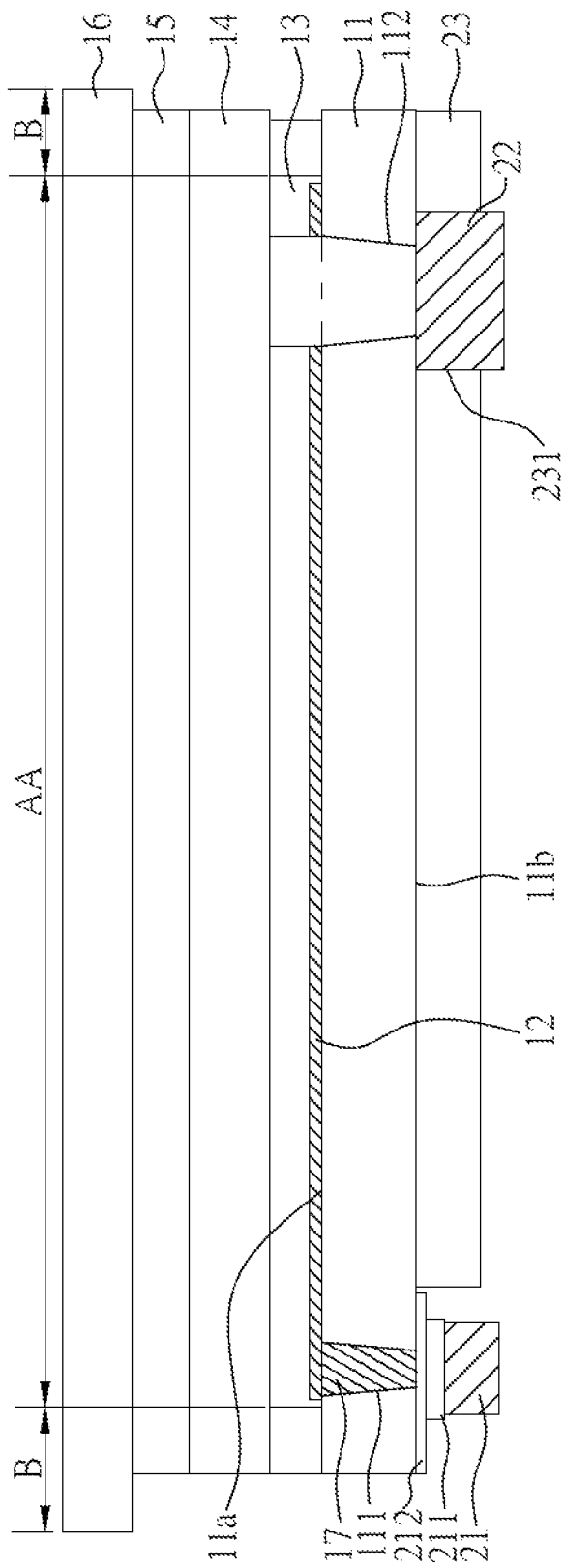
FIG. 11 is a cross-sectional view of a display device according to Embodiment 10 of the present disclosure.

FIG. 11 is a cross-sectional view of a display device of the present embodiment. The display device of the present embodiment is similar to that shown in Embodiment 4, except that the display device of the present embodiment further comprise a supporting film.

In the present embodiment, the display device further comprises a supporting film 23. The first substrate 11 is disposed between the supporting film 23 and the circuit layer 12. The supporting film 23 has a fourth hole 231 disposed corresponding to the second hole 112, and the second electronic unit 22 is disposed in the fourth hole 231 and corresponds to the second hole 112. By the disposition of the supporting film 23, the overall strength of the display device can further be improved.

Herein, the material of the supporting film 23 is not particularly limited, and the supporting film 23 can be a plastic substrate such as a PI substrate, a PET substrate, a PMMA substrate, or the like.

Embodiment 11

Figure 12:
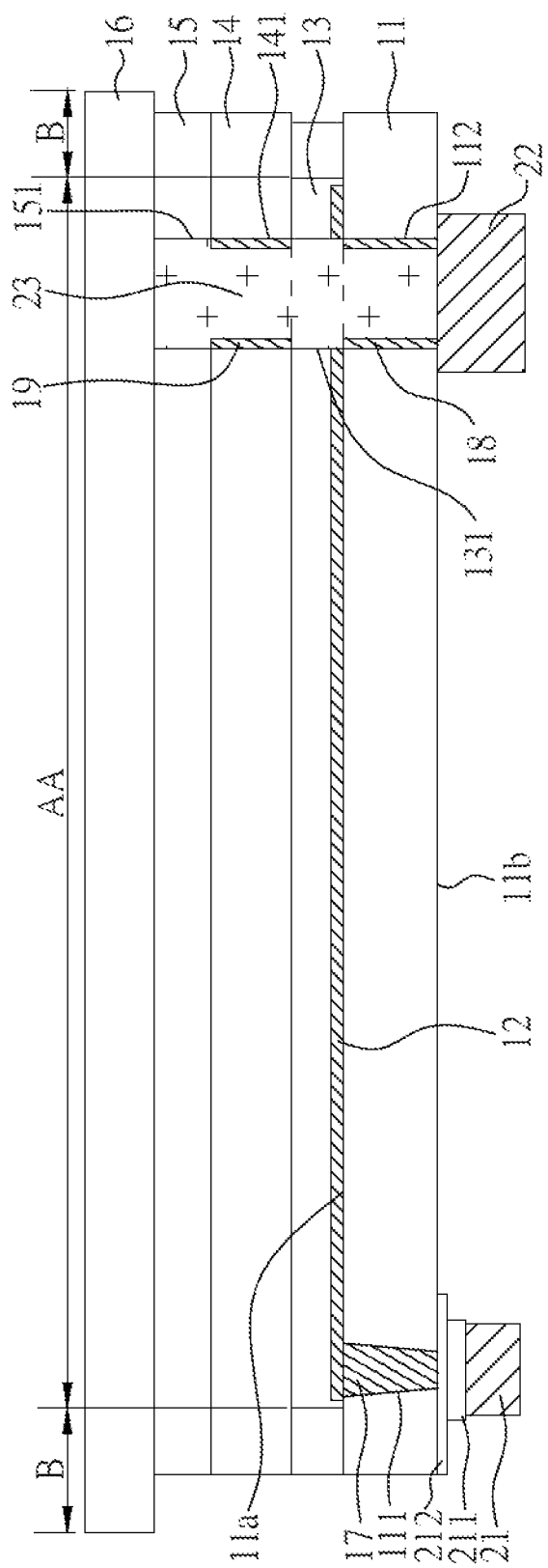
FIG. 12 is a cross-sectional view of a display device according to Embodiment 11 of the present disclosure.

FIG. 12 is a cross-sectional view of a display device of the present embodiment. The display device of the present embodiment is similar to that shown in Embodiment 8, except that at least one optical element and at least one sensing components are disposed in the display device of the present embodiment.

In the present embodiment, a first optical element 18 is further disposed on a side wall of in the second hole 112, and a second optical element 19 is further disposed on a side wall of the third hole 141. In addition, the adhesive layer 15 also has a fifth hole 151; and the second hole 112 of the first substrate 11, the first signal passing tunnel 131 of the display medium layer 13, the third hole 141 of the second substrate 14 and the fifth hole 151 of the adhesive layer 15 together form a hollow tunnel that signal can pass through the hollow tunnel. Furthermore, at least one sensing component 23 can optionally disposed in this hollow tunnel.

In the present embodiment, the first optical element 18 and the second optical element 19 can respectively be a reflective element to facilitate the light passing into the second electronic unit 22. In addition, the sensing component 23 can be components of the camera or the photo sensor, or the sensing component 23 can be a filter to select sensing signal corresponding to the second electronic unit 22. However, the present disclosure is not limited thereto.

Furthermore, in other embodiments of the present disclosure, the second hole 112 is not disposed with the first optical element 18, and the third hole 141 is disposed with the second optical element 19; and vice versa.

Embodiment 12

Figure 13:
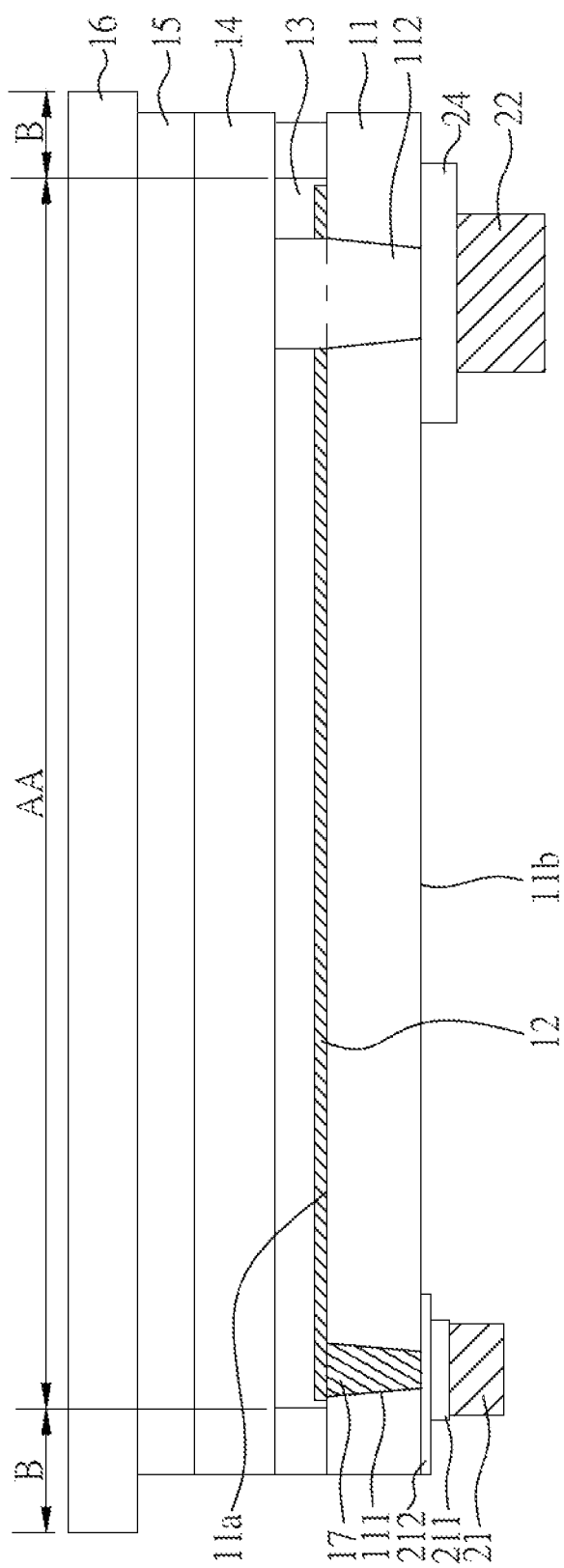
FIG. 13 is a cross-sectional view of a display device according to Embodiment 12 of the present disclosure.

FIG. 13 is a cross-sectional view of a display device of the present embodiment. The display device of the present embodiment is similar to that shown in Embodiment 4, except that a shutter unit is further disposed in the display device of the present embodiment.

The display device of the present embodiment further comprises a shutter unit 24 disposed corresponding to the second hole 112. The shutter unit 24 is disposed between the second electronic unit 22 and the first substrate 11, so the second electronic unit 22 could be hidden and the user might not observe the presence of the second electronic unit 22 when the second electronic unit 22 is not used; thus, the display quality of the display device can further be improved.

Herein, the shutter unit 24 can be a device capable of switching between transparent and opaque, for example, a liquid crystal display device; but the present disclosure is not limited thereto.

Embodiment 13

Figure 14:
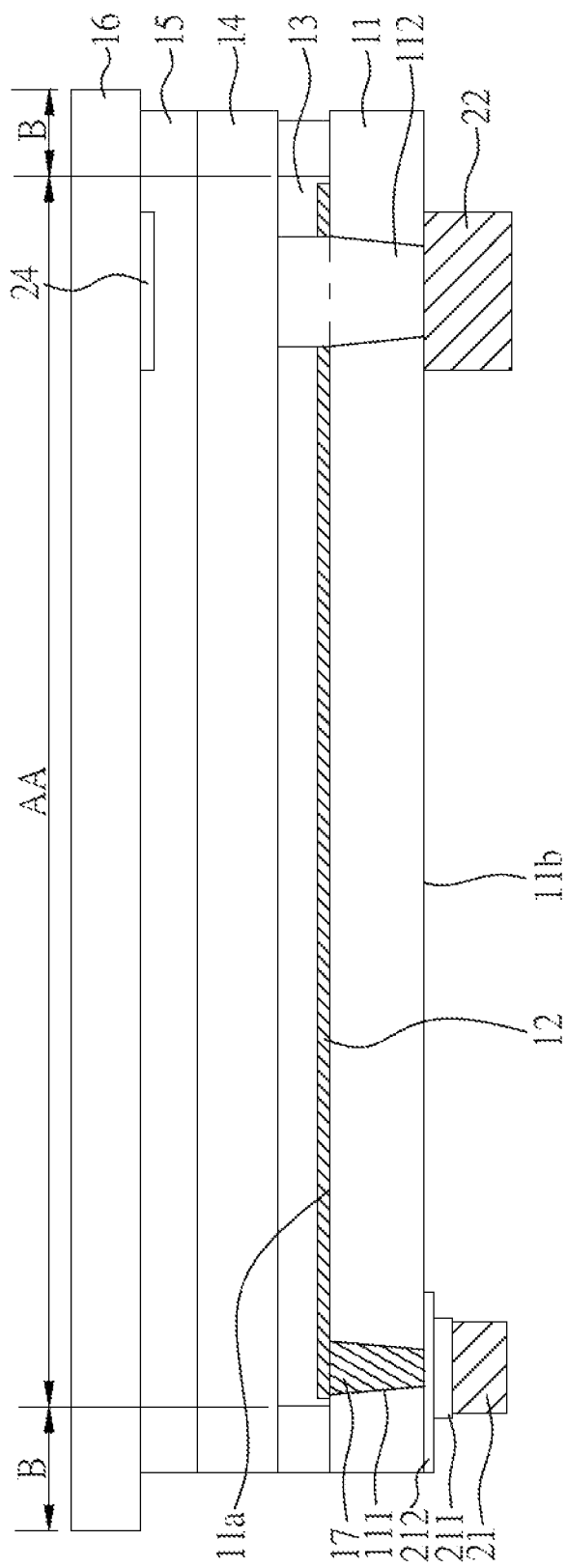
FIG. 14 is a cross-sectional view of a display device according to Embodiment 13 of the present disclosure.

FIG. 14 is a cross-sectional view of a display device of the present embodiment. The display device of the present embodiment is similar to that shown in Embodiment 12, except that the positions of the shutter units are different.

In the present embodiment, the first substrate 11 is disposed between the shutter unit 24 and the second electronic unit 22. As shown in FIG. 14, the shutter unit 24 is disposed below the cover substrate 16 and embedded into the adhesive layer 15. However, in other embodiments of the present disclosure, the shutter unit 24 may disposed on the second substrate 14 and embedded into the adhesive layer 15, but the present embodiment is not limited thereto. The shutter unit 24 can also be disposed at any suitable position.

Embodiment 14

Figure 15:
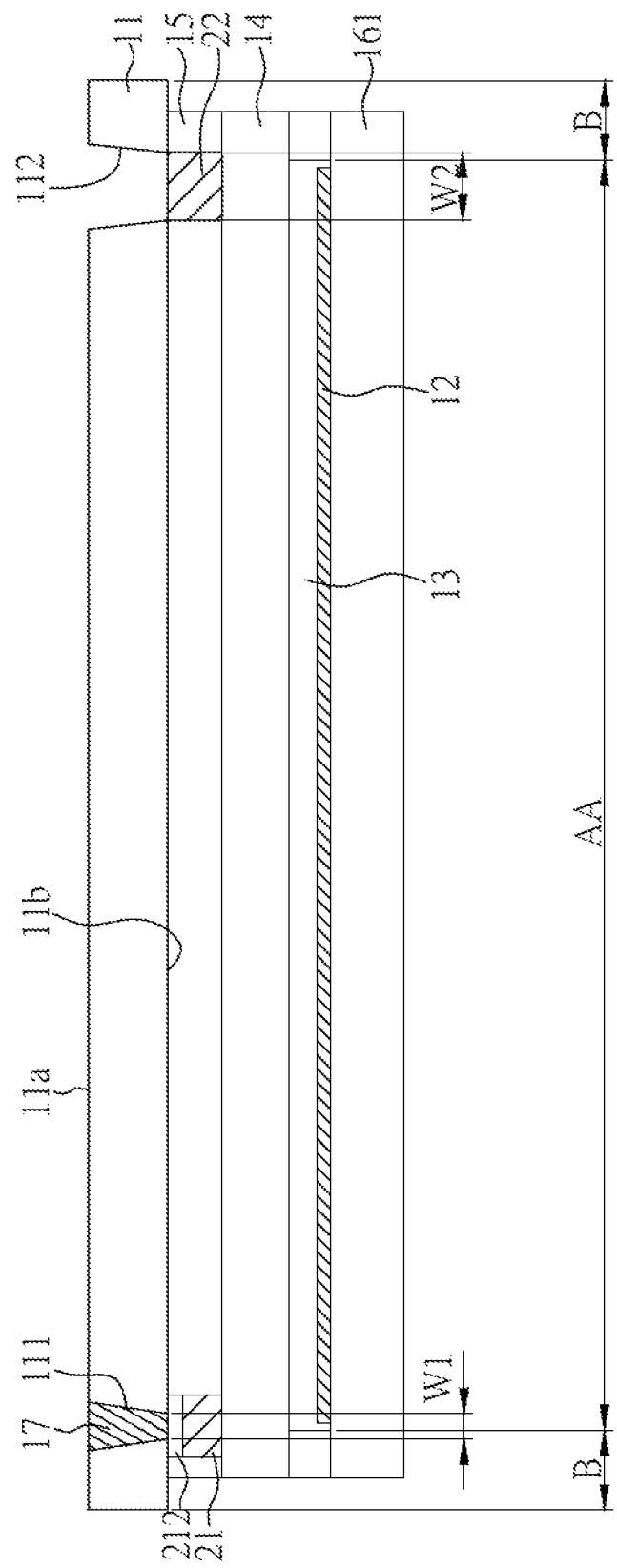
FIG. 15 is a cross-sectional view of a display device according to Embodiment 14 of the present disclosure.

FIG. 15 is a cross-sectional view of a display device of the present embodiment. Herein, the features of the display device of the present embodiment similar to those shown in Embodiment 1 are not repeated again.

The display device of the present embodiment comprises: a first substrate 11 having a first hole 111 and a second hole 112; a circuit layer 12 disposed at one side of the first substrate 11. Herein, the first substrate 11 has a first surface 11a and a second surface 11b opposite to the first surface 11a; and in the present embodiment, the circuit layer 12 is disposed under the second surface 11b. The features of the first hole 111 and the second hole 112 are similar to those stated in Embodiment 1, and are not repeated again.

The display device of the present embodiment comprises: a third substrate 161 with the circuit layer 12 disposed thereon; a display medium layer 13 disposed on the circuit layer 12; a second substrate 14 disposed on the display medium layer 13; an adhesive layer 15 disposed on the second substrate 14; and the first substrate 11 disposed on the adhesive layer 15, wherein the adhesive layer 15 is disposed between the first substrate 11 and the circuit layer 12. The material of the third substrate 161 is similar to the material of the first substrate 11 stated in Embodiment 1, and is not repeated again.

In the present embodiment, the display device further comprises: a first electronic unit 21 and a second electronic unit 22, wherein the first electronic unit 21 is disposed corresponding to the first hole 111, at least a part of the first electronic unit 21 is embedded in the adhesive layer 15, the second electronic unit 22 is disposed corresponding to the second hole 112, and at least a part of the second electronic unit 22 is embedded in the adhesive layer 15. In the present embodiment, the whole first electronic unit 21 and the whole second electronic unit 22 are embedded in the adhesive layer 15, but the present disclosure is not limited thereto. In other embodiments of the present disclosure, a part of the second electronic unit 22 or the whole second electronic unit 22 can be disposed in the second hole 112. In further other embodiments of the present disclosure, the second electronic unit 22 may not be embedded into the adhesive layer, as long as the second electronic unit 22 is disposed corresponding to the second hole 112.

Herein, a conductive element 17 is disposed in the first hole 111, and the conductive element 17 electrically connects with the first electronic unit 21 via a conductive layer 212 (which can be a circuit layer or a metal pad). In the present embodiment, the conductive element 17 is not used to transmit signal to the circuit layer 12, and is used as a part of an antenna or a receiving unit for radiofrequency identification (RFID), but the present disclosure is not limited thereto. Furthermore, in further other embodiments of the present disclosure, the first electronic unit 21 is not embedded in the adhesive layer 15 and/or is not disposed corresponding to the first hole 111, but the first electronic unit 21 is disposed on another region of the display device and electrically connects with the conductive element 17 through any conductive means (for example, a flexible print circuit board).

Embodiment 15

Figure 16:
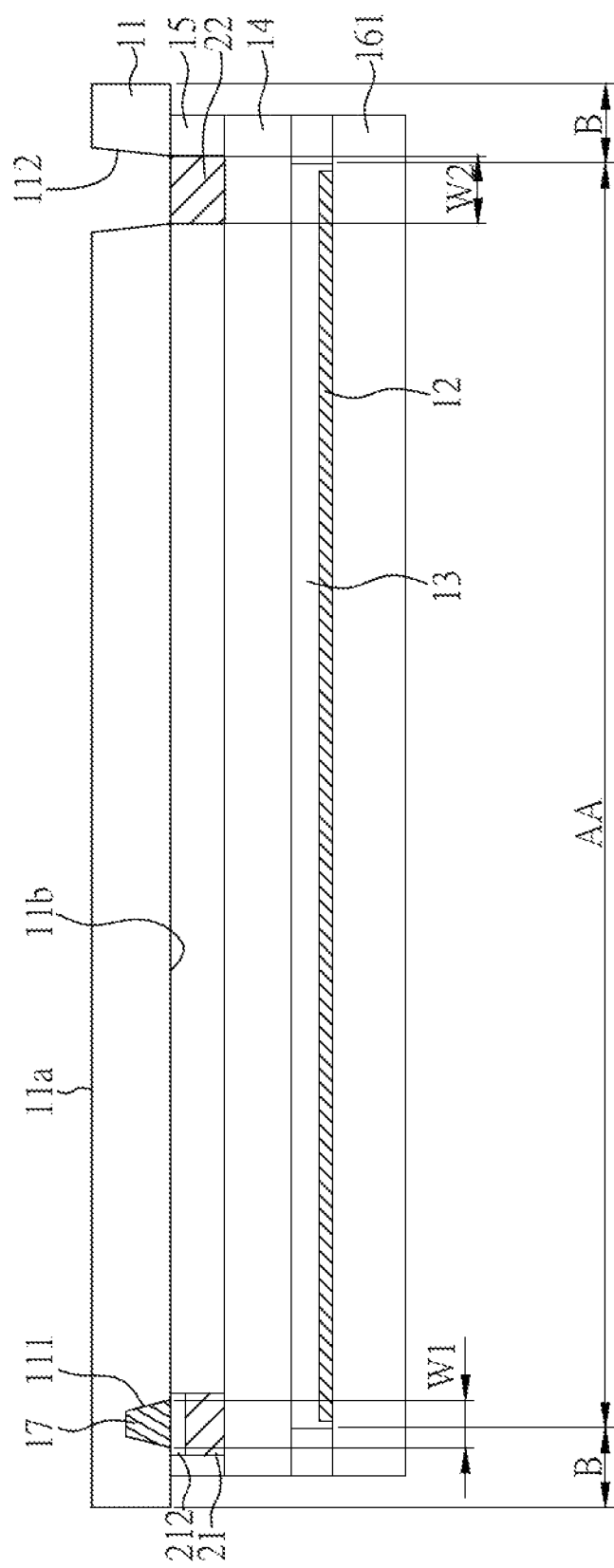
FIG. 16 is a cross-sectional view of a display device according to Embodiment 15 of the present disclosure.

FIG. 16 is a cross-sectional view of a display device of the present embodiment. The display device of the present embodiment is similar to that shown in Embodiment 14, except that the first hole 111 in the display device of the present embodiment is a via hole, but not a through hole.

The display device made as described in any of the embodiments of the present disclosure as described previously can be co-used with a touch panel to form a touch display device. Meanwhile, a display device or touch display device may be applied to any electronic devices known in the art that need a display screen, such as displays, mobile phones, laptops, video cameras, still cameras, music players, mobile navigators, TV sets, and other electronic devices that display images.

Although the present disclosure has been explained in relation to its embodiment, it is to be understood that many other possible modifications and variations can be made without departing from the spirit and scope of the disclosure as hereinafter claimed.

What is claimed is:
1. A display device, comprising:
a first substrate having a first hole and a second hole;
a circuit layer disposed at one side of the first substrate;
a supporting film having a fourth hole disposed corresponding to the second hole, wherein the first substrate is disposed between the supporting film and the circuit layer; and
a shutter unit and a second electronic unit, the shutter unit and the second electronic unit disposed corresponding to the second hole, wherein the shutter unit and the second electronic unit are overlapped in a normal direction of the first substrate;
wherein the first hole has a first width, the second hole has a second width, and a ratio of the second width to the first width is within a range between 20 and 4000.
2. The display device of claim 1, wherein the first width is within a range between 2 and 50 micrometers.
3. The display device of claim 1, wherein the second width is within a range between 1000 and 8000 micrometers.
4. The display device of claim 1, further comprising a display medium layer disposed on the first substrate, wherein the display medium layer has a first signal passing tunnel disposed corresponding to the second hole.
5. The display device of claim 4, wherein the display medium layer further has a second signal passing tunnel disposed corresponding to the first hole.
6. The display device of claim 4, further comprising a second substrate, wherein the display medium layer is disposed between the first substrate and the second substrate, the second substrate has a third hole, and the second hole is disposed corresponding to the third hole to form a tunnel, wherein in a cross-sectional view, the second hole has at least two different widths.
7. The display device of claim 1, wherein the first substrate has a first surface and a second surface opposite to the first surface, the circuit layer is disposed on the first surface, and the first width is a width of the first hole on the second surface, and the second width is a width of the second hole on the second surface.

8. The display device of claim 1, wherein a conductive element is disposed in the first hole, and in a cross-sectional view, the conductive element has at least two different widths.

9. The display device of claim 8, wherein the conductive element is electrically connected with the circuit layer.

10. The display device of claim 1, wherein an optical element is disposed in the second hole.

11. The display device of claim 1, further comprising a first electronic unit disposed corresponding to the first hole.

12. The display device of claim 11, wherein at least a part of the first electronic unit is disposed in the first hole and at least a part of the second electronic unit is disposed in the second hole.

13. The display device of claim 1, wherein the first hole and the second hole are disposed in a display region of the display device.

14. The display device of claim 1, wherein the second electronic unit is disposed in the fourth hole.

15. The display device of claim 1, wherein the shutter unit is disposed between the second electronic unit and the first substrate.

16. The display device of claim 1, wherein the first substrate is disposed between the shutter unit and the second electronic unit.

17. The display device of claim 1, further comprising an adhesive layer, a first electronic unit, wherein the adhesive layer is disposed between the first substrate and the circuit layer, the first electronic unit is disposed corresponding to the first hole, wherein at least a part of the second electronic unit is in contact with the adhesive layer.

18. The display device of claim 17, wherein at least a part of the first electronic unit is embedded in the adhesive layer or at least a part of the second electronic unit is embedded in the adhesive layer.

* * * * *